Dec. 8, 1953 — C. E. ANDERSHOCK — 2,661,629
TRAMMING DRIVE FOR MINING AND LOADING MACHINE
Filed July 18, 1951 — 3 Sheets-Sheet 1

Inventor
Chester E. Andershock
By Murray A. Gleeson
Attorneys

Dec. 8, 1953  C. E. ANDERSHOCK  2,661,629
TRAMMING DRIVE FOR MINING AND LOADING MACHINE
Filed July 18, 1951  3 Sheets-Sheet 2

Inventor
Chester E. Andershock
By Murray A. Gleeson
Attorney

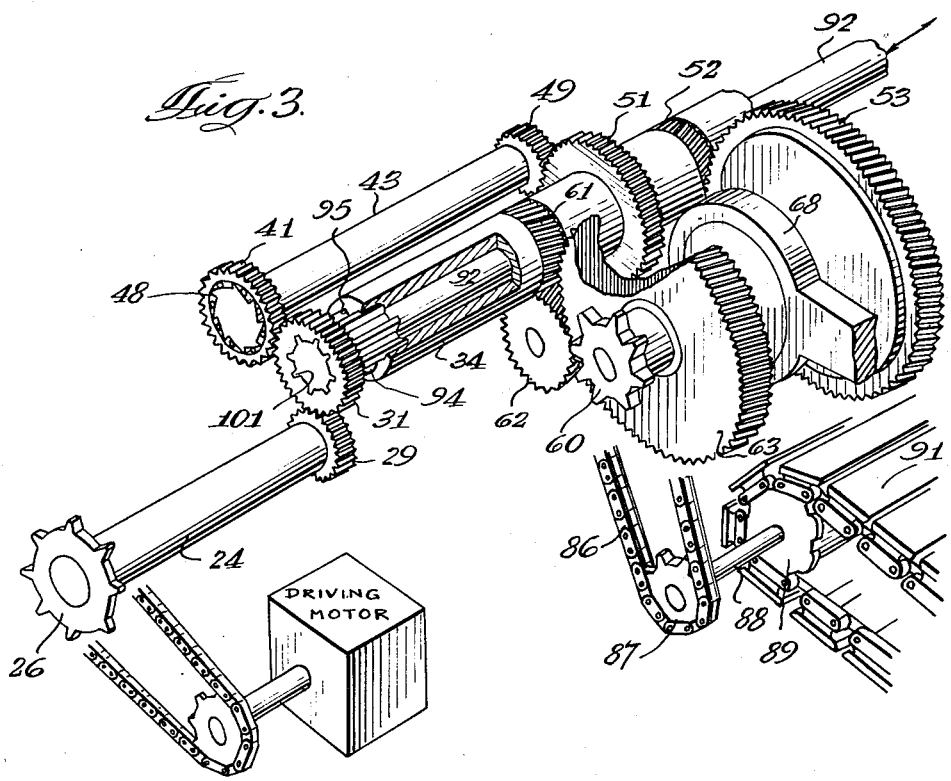

Patented Dec. 8, 1953

2,661,629

UNITED STATES PATENT OFFICE 2,661,629

TRAMMING DRIVE FOR MINING AND LOADING MACHINE

Chester E. Andershock, Chicago, Ill., assignor to Goodman Manufacturing Company, Chicago, Ill., a corporation of Illinois Application July 18, 1951, Serial No. 237,425

12 Claims. (Cl. 74—368)

1

This invention relates generally to self-propelled mining machinery and more particularly to a change speed mechanism for the tramming drive thereof.

Certain types of trackless mining equipment, as for example endless tread loading machines disclosed in Cartlidge Patents No. 2,269,078 and 2,381,103, are provided with reversing mechanisms for controlling the direction of the vehicle in tramming. While varying the speed of tramming may be achieved by a number of different mechanisms, yet the simplest and an entirely effective way is by change gear mechanisms. In tramming mining vehicles it is ordinarily sufficient that they be operated at either high or low speed, and while a change speed mechanism for low and high speed operation is ordinarily not difficult of fabrication, yet the space requirements of the tramming and reversing mechanisms have not permitted of the inclusion of such change speed mechanisms.

Heretofore the change speed gearing has been shifted by actuators which have included in some cases shifting yokes. In carrying out the invention herein, however, the gearing of the change speed mechanism is maintained in constant mesh, and change in speed is achieved by an integral spline and actuator which is longitudinally shiftable within a hollow pinion shaft forming the driving means for reverse gearing of the tramming mechanism. The hollow pinion shaft turns on an axis which is common to a drive pinion meshing with a pinion mounted on a stub shaft driven through a sprocket drive from the drive motor. The intermediate pinion is in constant mesh with a pinion having an overrunning clutching connection with a lay or countershaft which is also geared to the pinion shaft at another point therealong. The drive pinion and the hollow pinion shaft are formed with internal spline surfaces which cooperate with external spline surfaces on the longitudinally movable actuator so that the drive may be direct from the driving pinion to the pinion shaft, and so that the pinion shaft is driven at high speed, and so that the lay shaft overruns the pinion mounted thereon which is in constant mesh with the driving pinion. The actuator is also shiftable to a position with its integral spline out of engagement with the driving pinion, so that the drive is through the driving pinion, the pinion mounted on the lay shaft and the lay shaft to the pinion shaft, to drive the pinion shaft at reduced speed.

It is a principal object of this invention to provide a change speed mechanism for the tramming

2 drive of a mine vehicle wherein the actuator is formed integrally with a splined connector for achieving change speed.

It is a principal object of this invention to provide a change speed mechanism for the tramming drive of a mine vehicle wherein the actuator is formed integrally with a splined connector for achieving change speed.

Another object is to provide a change speed gear tram wherein the change of speed is achieved by a splined actuator wholly enclosed within the driven shaft of the gear train.

Still another object of the invention is to provide a change speed mechanism characterized by the use of constant mesh gears and an overrunning clutch for use with certain of the gears of the train, the clutch being made operable to transmit power upon the longitudinal shifting of an actuator wholly enclosed by the final driven shaft of the mechanism and having a spline formed integrally therewith.

Other predominant objects and particular advantages of the invention will suggest themselves in the course of the following description taken with the drawings, which together are intended to illustrate the principles of the invention as contained within an embodiment which is considered to be the best mode of applying the principles thereof. It is contemplated also that other embodiments of the invention as may fall within the purview and scope of the appended claims are intended to be reserved.

In the drawings:

Fig. 3 is a more or less schematic perspective view illustrating the change speed mechanism shown in Figs. 1 and 2.

Figure 1:
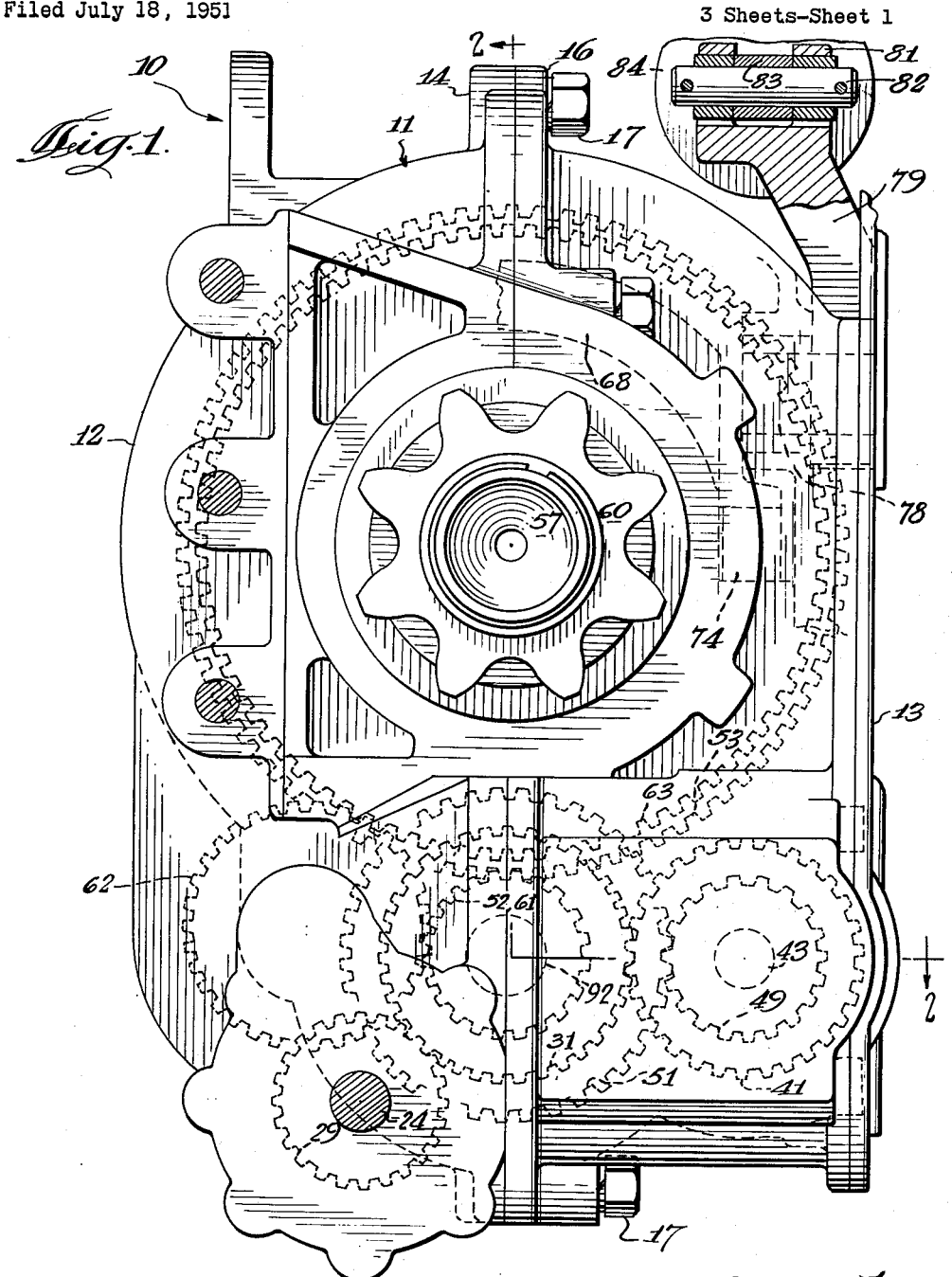
Fig. 1 is an end view of a drive transmission for one of the endless treads of a self-propelled mine vehicle, said transmission embodying the invention herein.
Figure 2:
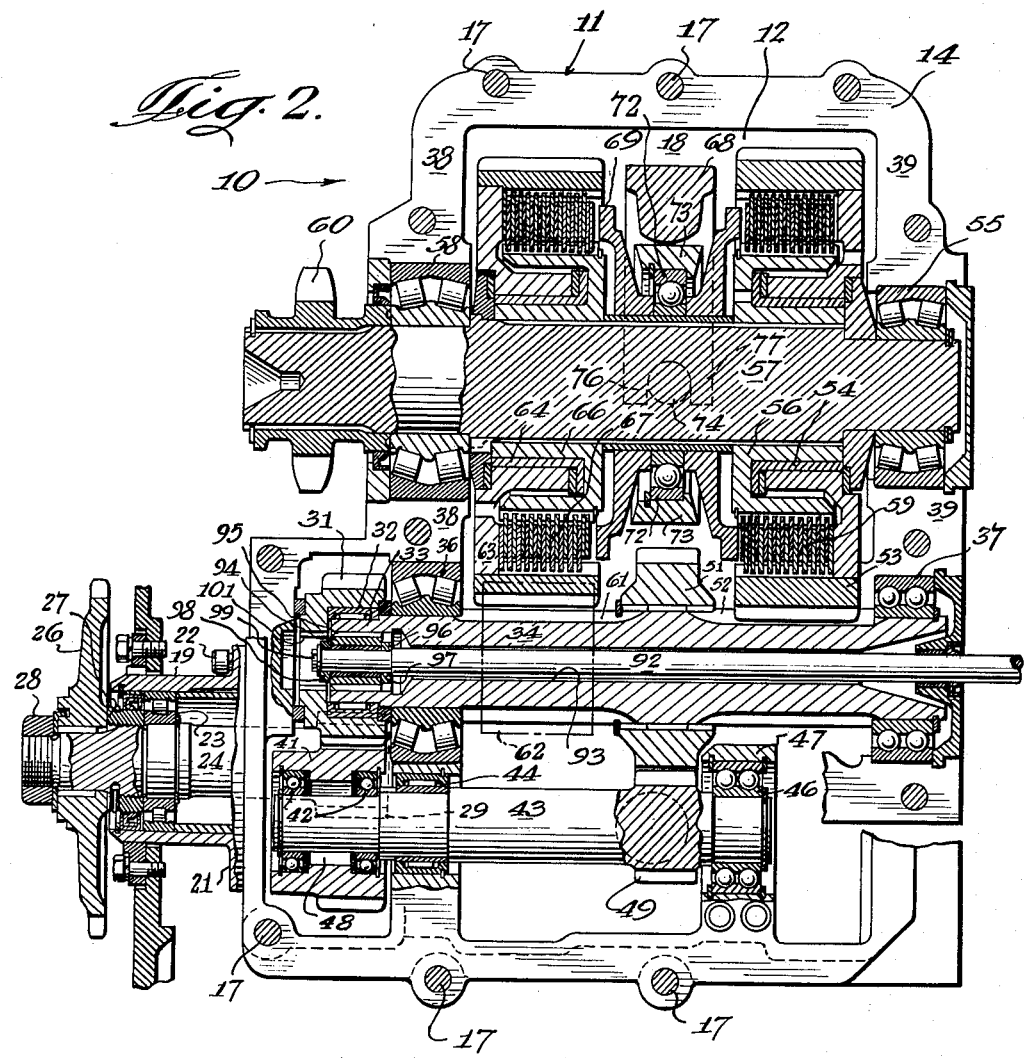
Fig. 2 is a vertical longitudinal section taken on the line 2—2 of Fig. 1 looking in the direction of the arrows, and showing the disposition of the reverse and forward drive and the change speed mechanism therefor.

Referring now to the drawings, the change speed mechanism according to the present invention is indicated generally by the reference numeral 10, and includes a housing 11 made of a pair of casings 12 and 13 having flanges 14 and 16 respectively, which are joined together by a plurality of cap bolts 17. The two casings 12 and 13 thus define a cavity 18 for enclosing the change speed mechanism according to the present invention. Referring particularly to Fig. 2, the casing 12 has an annular flange 19 extending therefrom, there being a plurality of cap bolts 22 holding the flange 19 to the casing 12. The flange 19 affords a support for a journal bearing 23, and a stub shaft 24 is mounted to turn in the bearing 23. A drive sprocket 26 is keyed to the stub shaft 24 and is held in position between a collar 27 threaded to the shaft 24 and a nut 28 threaded to the outer end of the stub shaft 24.

A stub shaft pinion 29 is fast upon the inner end of the stub shaft 24 and is adapted to mesh with a driving pinion 31. As seen in Fig. 2, the driving pinion 31 is substantially cup shaped and is fitted with a needle bearing 32 supported upon one end 33 of a hollow pinion shaft 34, the pinion shaft 34 being supported for rotation in bearings 36 and 37 held respectively in walls 38 and 39 of the casings 11 and 12. The drive pinion 31 meshes with a lay shaft pinion 41 mounted on bearings 42, 42 which in turn are supported upon a lay shaft 43. The lay shaft 43 is supported in a needle bearing 44 held in the wall 38 and in a bearing 46 mounted in a pillow block 47 extending within the cavity 18. The lay shaft pinion 41 is provided with an overrunning clutch 48 so that the lay shaft 43 will overrun with respect to the lay shaft pinion 41 under conditions as will be described. The lay shaft 43 is formed integrally with a gear 49 which meshes with a gear 51 keyed to the hollow pinion shaft 34.

Under conditions as will be described, the pinion shaft 34 is adapted to be driven at either low or high speeds depending upon the driving connection of the driving pinion therewith, but irrespective of the speed at which the pinion shaft 34 is driven, said pinion shaft at all times is in mesh with a pair of oppositely rotating helical gears of a reversing train. Said gears are so designed as to give the same speed to the tramming mechanism whether in the forward or the reverse direction. The pinion shaft 34 is accordingly cut with a pair of splines of the same diametral pitch having an identical number of teeth and adapted to run with reversing gears having an identical number of teeth. Since one of the gears is a reversing gear and runs in an opposite direction with respect to the other gear while being driven from the same spline a reaching gear must be provided to provide such change in direction of rotation of such reversing gear. The two helical reversing gears have substantially the same pitch diameters and the same number of teeth, and since one of them must run with a reaching gear to effect reversal of direction, the helix angle of each gear is changed to provide the same speed for each. To this end the hollow pinion shaft 34 is formed with an external helical spline meshing with a helical gear 53 supported on a bushing 54 which in turn is supported upon a driven clutch member 56 splined to a driven countershaft 57. The driven countershaft 57 is supported in bearings 58 and 55 held respectively in the walls 38 and 39 and a driven sprocket 69 is keyed to the end of the countershaft 57 extending outside of the housing 11. Clutching means indicated generally by the reference numeral 59 are provided for affording a driving connection between the helical gear 53 and the driven splined member 56. The precise form of the clutch shown herein forms no part of the instant invention, and while a multiple disc clutch is shown, it is contemplated that other forms of clutches may be employed.

The hollow pinion shaft 34 is likewise provided with a helical spline 61 which meshes with a helical reach gear 62, the reach gear 62 in turn meshing with a helical reversing gear 63 supported in a fashion similar to the forward gear 53 upon a bushing 64 which in turn is supported upon a driven spline 66. As with the gear 53, clutching means indicated generally by the reference numeral 67 are provided to afford a driving connection between the driven spine 66 and the reverse gear 63.

As has been explained, the helical splines 52 and 61 have an identical number of teeth, and the forward gear 53 and the reversing gear 63 also have an identical number of teeth. It will be noted also that the reversing gear 63 has a smaller pitch diameter than the forward gear 53, and in order to provide for an equal number of teeth on the reversing gear and the forward gear, their cooperating splines 52 and 61 are cut on different helix angles as are their respecting meshing gears 53, and reach gear 62 and reverse gear 63. By way of example, the helix angle of the spline 52 and its meshing gear 53 is of the order of 22° 7', while the helix angle of the spline 61 and its meshing reach gear 62 and reversing gear 63 is of the order of 11°, which design allows a pitch diameter of 2.377" on helical spline 61 and a pitch diameter of 2.513" on helical spline 52, both having fourteen teeth and a pitch diameter of 10.187" on helical reverse gear 63 and a pitch diameter of 10.794" on helical forward gear 53, both having sixty teeth.

The gears 53 and 63 are selectively clutched through their respective clutches 59 and 67 to the driven countershaft 57 by a clutch shifter yoke 68. A pair of clutch pressure plates 69 and 71 cooperate respectively with the clutches 67 and 59 and are spaced by a thrust bearing 72 held in a shifter ring 73. Gimbals 74 extend in opposite directions from the outer surface of the shifter ring 73 and are embraced between arms 76 and 77 formed on the yoke 68.

Means are provided for rocking the yoke 68 for clutching engagement of either clutch 59 or 67, and to this end the yoke 68 is provided with a journal pin 78 journalled in a wall of the casing 13 and extending therethrough. A rock arm 79 is fast to the protruding journal pin 78 and terminates in a clevis 81 connected by a pin 82 to an actuator piston rod 83 of an hydraulic actuating cylinder 84.

It will be seen from the description thus far that with power applied to the hollow pinion shaft 34, the driven sprocket 69 mounted on the countershaft 57 may be rotated in forward or reverse direction according to whichever clutch is in engagement. The driven sprocket 69 is connected as seen in Fig. 3 by a drive chain 86 to a chain sprocket 87. A shaft 88 connects sprocket 87 to a crawler tread sprocket 89 which drives a crawler tread 91. It may be noted that a similar drive is provided for an opposite crawler tread, not shown, so that one tread may be operated in the forward direction with the opposite operated in the reverse direction for rapid turning of the vehicle in close quarters such as may be encountered in a mine.

Mechanism is provided for operating the transmission thus far described in either high or low speed. As shown in Fig. 2, the hollow pinion shaft 34 wholly encloses a change speed actuator rod 92 which is longitudinally shiftable within a bore 93 in the hollow pinion shaft. The actuator rod 92 has a spline 94 held to one end of the actuator and between a thrust ring 96 bearing against a shoulder 97 of the actuator 92, and a retainer ring 98 and nut 99 threaded to the actuator rod 92. The hollow pinion shaft 34 also has an internal spline 95 which meshes with the spline 94, and the driving pinion 31 is also provided with an internal spline 101 adapted to mesh with the external spline 94 supported on the actuator rod 92, so that a direct driving connection can be afforded between the driving pinion 31 and the hollow pinion shaft 34.

It will be apparent that when the actuator rod 92 and spline 94 are shifted to the left whereby a direct driving connection is made to the hollow pinion shaft 34, the gear 51 thereon will drive gear 49 and lay shaft 43 at a speed which is greater than the speed of lay shaft 43. The overrunning clutch 48 under such condition will enable the lay shaft 43 to overrun the pinion 41 meshing with the driving pinion 31. Change speed of the pinion shaft 34 is effected by moving the actuator rod 92 and spline 94 to the position as seen in Fig. 2. Under this condition driving pinion 31 will rotate with respect to the hollow pinion shaft 34 on the needle bearings 32 and drive the pinion 41 on the lay shaft 43, the overrunning clutch 48 under such condition being effective to provide clutching engagement of the pinion 41 with the lay shaft 43. The gear 49 on lay shaft 43 will drive gear 51 on the hollow pinion shaft 34 at a reduced speed.

It may be noted that gears 49 and 51 may be reversed in position and the clutch 48 so arranged that pinion 41 may overrun lay shaft 43. With such an arrangement high speed would be had with the actuator 92 and spline 94 in the position seen in Fig. 2, while with the spline 94 shifted to the left low speed operation would be had.

From the foregoing description it will be apparent that a change speed mechanism is provided by the use of a splined actuator which is shiftable within a hollow driven shaft thus making unnecessary the use of complicated and space taking shifter yokes and actuators. The change speed mechanism according to the invention herein is especially advantageous where space saving requirements must be met, and by the use of the change speed mechanism described herein an extremely compact unit will be had.

While the invention has been described in terms of an embodiment which it has assumed in practice it is not intended that the invention be limited to the precise showing thereof herein, and the scope of the invention, therefore, is intended to be defined by the claims herein appended.

I claim:

1. In a mining machine having ground engaging traction means and a reversing mechanism therefor including a countershaft supporting a pair of reversing gears rotatable on said countershaft at equal speeds in opposite direction by a driving connection with a hollow pinion shaft; the combination therein of a change speed mechanism for causing said traction means to operate selectively at low or high speeds comprising a driving pinion supported on said hollow pinion shaft at times adapted to rotate with respect thereto and having an internal spline therein and adapted to be drivably connected directly to said hollow pinion shaft for one speed thereof, a lay shaft having a gear fast thereon, a gear fast to said pinion shaft and meshing with said gear fast on said lay shaft, a pinion supported on said lay shaft and meshing with said driving pinion, clutching means interposed between said lay shaft supported pinion and said lay shaft for an overrunning connection therebetween, an internal spline formed in said hollow pinion shaft, and a splined actuator which is axially shiftable within said internally splined hollow pinion shaft for drivably and directly connecting said splined driving pinion to said internally splined hollow pinion shaft.

2. In a mining machine having ground engaging traction means and a reversing mechanism therefor including a countershaft supporting a pair of reversing gears rotatable on said countershaft at equal speeds in opposite direction by a driving connection with a hollow pinion shaft; the combination therein of a change speed mechanism for causing said traction means to operate selectively at low or high speeds comprising a driving pinion supported on said hollow pinion shaft at times adapted to rotate with respect thereto and adapted to be drivably connected directly to said hollow pinion shaft for one speed thereof, a lay shaft having a gear fast thereon, a gear fast to said pinion shaft and meshing with said gear fast on said lay shaft, a pinion supported on said lay shaft and meshing with said driving pinion, clutching means interposed between said lay shaft supported pinion and said lay shaft for an overrunning connection therebetween, and an actuator and connector wholly enclosed within said hollow pinion shaft and movable longitudinally therein for drivably and directly connecting said driving pinion to said hollow pinion shaft.

3. In a mining machine having ground engaging traction means and a reversing mechanism therefor including a countershaft supporting a pair of reversing gears rotatable on said countershaft at equal speeds in opposite direction by a driving connection with a hollow pinion shaft; the combination therein of a change speed mechanism for causing said traction means to operate selectively at low or high speeds comprising a driving pinion supported on said hollow pinion shaft at times adapted to rotate with respect thereto and having an internal spline therein, a lay shaft having a gear fast thereon, a gear fast to said hollow pinion shaft and meshing with said gear fast on said lay shaft, a pinion supported on said lay shaft and meshing with said driving pinion, clutching means interposed between said lay shaft supported pinion and said lay shaft whereby said lay shaft may overrun with respect to said lay shaft supported pinion when said driving pinion is drivably connected to said hollow pinion shaft and whereby a driving connection is afforded between said lay shaft supported pinion and said lay shaft when said driving pinion is no longer drivably connected to said hollow pinion shaft, an internal spline formed in said hollow pinion shaft, and a splined actuator which is axially shiftable within said hollow internally splined pinion shaft for drivably and directly connecting said splined driving pinion to said splined hollow pinion shaft.

4. In a mining machine having ground engaging traction means and a reversing mechanism therefor including a countershaft supporting a pair of reversing gears rotatable on said countershaft at equal speeds in opposite direction by a driving connection with a hollow pinion shaft; the combination therein of a change speed mechanism for causing said traction means to operate selectively at low or high speeds comprising a driving pinion supported on said hollow pinion shaft at times adapted to rotate with respect thereto and adapted to be drivably connected directly to said hollow pinion shaft for high speed thereof, a lay shaft having a gear fast thereon, a gear fast to said pinion shaft and meshing with said gear fast on said lay shaft, a pinion supported on said lay shaft and meshing with said driving pinion, clutching means interposed between said lay shaft supported pinion and said lay shaft whereby said lay shaft may overrun with respect to said lay shaft supported pinion when said driving pinion is drivably connected to said pinion shaft and whereby a driving connection is afforded between said lay shaft supported pinion and said lay shaft when said driving pinion is no longer drivably connected to said hollow pinion shaft, and an actuator and connector wholly enclosed within said hollow pinion shaft and movable longitudinally therein for drivably and directly connecting said driving pinion to said hollow pinion shaft.

5. In a mining machine having ground engaging traction means and a reversing mechanism therefor including a countershaft supporting a pair of reversing gears rotatable on said countershaft at equal speeds in opposite direction by a driving connection with a hollow pinion shaft; the combination therein of a change speed mechanism for causing said traction means to operate selectively at low or high speeds comprising a driving pinion adapted to be drivably connected directly to said hollow pinion shaft for high speed thereof, a lay shaft having a gear fast thereon, a gear fast to said pinion shaft and meshing with said gear fast on said lay shaft, a pinion supported on said lay shaft and meshing with said driving pinion, clutching means interposed between said lay shaft supported pinion and said lay shaft whereby said lay shaft may overrun with respect to said lay shaft supported pinion when said driving pinion is drivably connected to said pinion shaft and whereby a driving connection is afforded between said lay shaft supported pinion and said lay shaft when said driving pinion is no longer drivably connected to said hollow pinion shaft, and an actuator and connector wholly enclosed within said hollow pinion shaft and movable longitudinally therein for drivably and directly connecting said driving pinion to said hollow pinion shaft.

6. In a mining machine having ground engaging traction means and a reversing mechanism for changing the direction of said machine by reversal of said traction means including a hollow pinion shaft for imparting rotation to reversing gears selectively and operatively connected to said traction means; the combination therein of a change speed mechanism for causing said traction means to operate selectively at low or high speeds comprising a driving pinion supported on said hollow pinion shaft and at times adapted to rotate with respect thereto and having an internal spline therein, a lay shaft having a gear fast thereon, a gear fast to said hollow pinion shaft and meshing with said gear fast on said lay shaft, a pinion supported on said lay shaft and meshing with said driving pinion, clutching means interposed between said lay shaft supported pinion and said lay shaft whereby said lay shaft may overrun with respect to said lay shaft supported pinion, an internal spline formed in said hollow pinion shaft, and an actuator which is axially shiftable within said hollow pinion shaft and having an external spline thereon mating with the internal spline formed on said driving pinion and said hollow pinion shaft for drivably and directly connecting said driving pinion to said hollow pinion shaft.

7. In a mining machine having ground engaging traction means and a reversing mechanism for changing the direction of said machine by reversal of said traction means including a hollow pinion shaft for imparting rotation to reversing gears selectively and operatively connected to said traction means; the combination therein of a change speed mechanism for causing said traction means to operate selectively at low or high speeds comprising a driving pinion supported on said hollow pinion shaft and at times adapted to rotate with respect thereto, a lay shaft having a gear fast thereon, a gear fast to said hollow pinion shaft and meshing with said gear fast on said lay shaft, a pinion supported on said lay shaft and meshing with said driving pinion, clutching means interposed between said lay shaft supported pinion and said lay shaft whereby said lay shaft may overrun with respect to said pinion, and an actuator and connector wholly enclosed within said hollow pinion shaft and movable longitudinally therein for drivably and directly connecting said driving pinion to said hollow pinion shaft.

8. In a mining machine having ground engaging traction means and a reversing mechanism for changing the direction of said machine by reversal of said traction means including a hollow pinion shaft for imparting rotation to reversing gears selectively and operatively connected to said traction means; the combination therein of a change speed mechanism for causing said traction means to operate selectively at low or high speeds comprising a driving pinion, a lay shaft having a gear fast thereon, a gear fast to said hollow pinion shaft and meshing with said gear fast on said lay shaft, a pinion supported on said lay shaft and meshing with said driving pinion, clutching means interposed between said lay shaft supported pinion and said lay shaft whereby said lay shaft may overrun with respect to said lay shaft supported pinion, and an actuator and connector wholly enclosed within said hollow pinion shaft and movable longitudinally therein for drivably and directly connecting said driving pinion to said hollow pinion shaft.

9. In a change speed mechanism, a hollow driven shaft, a driving pinion supported on said hollow driven shaft, a lay shaft having a gear fast thereon, a gear mounted on said hollow driven shaft and meshing with said lay shaft gear, a pinion supported on said lay shaft and meshing with said driving pinion, clutching means interposed between said lay shaft supported pinion and said lay shaft for an overrunning connection therebetween, an internal spline formed in said hollow driven shaft, an internal spline formed in said driving pinion, and a splined actuator which is axially shiftable within said hollow driven shaft for drivably and directly connecting said splined driving pinion to said internally splined hollow driven shaft.

10. In a change speed mechanism, a hollow driven shaft, a driving pinion supported on said hollow driven shaft at times adapted to rotate with respect thereto and adapted to be drivably connected directly to said hollow driven shaft for one speed thereof, a lay shaft having a gear fast thereon, a gear fast to said driven shaft and meshing with said lay shaft gear, a pinion supported on said lay shaft and meshing with said driving pinion, clutching means interposed between said lay shaft supported pinion and said lay shaft for an overrunning connection therebetween, and an actuator and connector wholly enclosed within said hollow driven shaft and movable longitudinally therein for drivably and directly connecting said driving pinion to said hollow driven shaft.

11. In a change speed mechanism, a hollow driven shaft, a driving pinion supported on said hollow driven shaft at times adapted to rotate with respect thereto and having an internal spline therein, a lay shaft having a gear fast thereon, a gear fast to said hollow driven shaft and meshing with said gear fast upon said lay shaft, a pinion supported on said lay shaft and meshing with said driving pinion, clutching means interposed between said lay shaft supported pinion and said lay shaft whereby said lay shaft may overrun with respect to said lay shaft supported pinion when said driving pinion is drivably connected to said hollow driven shaft and whereby a driving connection is afforded between said lay shaft supported pinion and said lay shaft when said driving pinion is no longer drivably connected to said hollow driven shaft, an internal spline formed in said hollow driven shaft, and a splined actuator which is axially shiftable within said internally splined hollow driven shaft for drivably and directly connecting said splined driving pinion to said splined hollow driven shaft.

12. In a change speed mechanism, a hollow driven shaft, a driving pinion supported on said hollow driven shaft at times adapted to rotate with respect thereto and having an internal spline therein, a lay shaft having a gear fast thereon, a gear fast to said hollow driven shaft and meshing with said gear fast upon said lay shaft, a pinion supported on said lay shaft and meshing with said driving pinion, clutching means interposed between said lay shaft supported pinion and said lay shaft whereby said lay shaft may overrun with respect to said lay shaft supported pinion when said driving pinion is drivably connected to said hollow driven shaft and whereby a driving connection is afforded between said lay shaft supported pinion and said lay shaft when said driving pinion is no longer drivably connected to said hollow driven shaft, and an actuator and connector wholly enclosed within said hollow driven shaft and movable longitudinally therein for drivably and directly connecting driving pinion to said hollow driven shaft.

CHESTER E. ANDERSHOCK.

References Cited in the file of this patent

UNITED STATES PATENTS

| Number | Name | Date |
|---|---|---|
| 2,052,651 | Pearmain | Sept. 1, 1936 |
| 2,055,523 | Dingeldein | Sept. 29, 1936 |
| 2,109,290 | Heckman | Feb. 22, 1938 |
| 2,567,446 | Polomski | Sept. 11, 1951 |

FOREIGN PATENTS

| Number | Country | Date |
|---|---|---|
| 596,307 | Great Britain | Jan. 1, 1948 |